Oct. 14, 1941. A. G. EWERTH 2,259,303
HARROWING SCRAPER IN SEED SOWING MACHINES
Original Filed Nov. 19, 1938
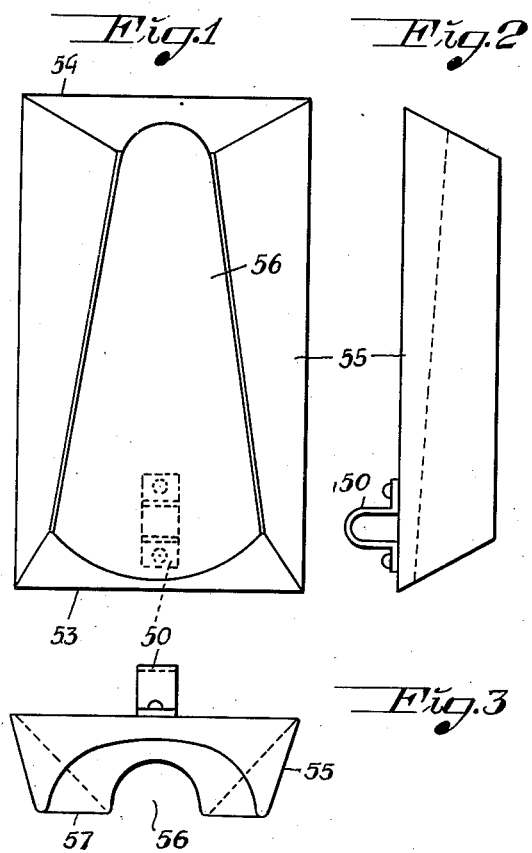
INVENTOR:
ANTON GEORG EWERTH
BY: Haseltine, Lake & Co.
ATTORNEYS Patented Oct. 14, 1941

2,259,303

UNITED STATES PATENT OFFICE 2,259,303

HARROWING SCRAPER IN SEED SOWING MACHINES

Anton Georg Ewerth, Stocksund, Sweden, assignor to Erik Vilhelm Walter Hallwyl Von Geijer, Stockholm, Sweden Original application November 19, 1938, Serial No. 241,304. Divided and this application July 14, 1939, Serial No. 284,473. In Sweden September 9, 1938

2 Claims. (Cl. 97—56)

This application is a division of my copending application Serial No. 241,304 filed November 19, 1938.

The present invention relates to seed sowing machines and refers more particularly to a scraper which has for its object to close the drills or furrows after the seed has been deposited therein.

According to the invention the scraper is substantiallly characterized by the fact that it comprises a block or plate adapted to be advanced on the ground and having edge surfaces inclined inwardly. This shape of the scraper prevents the scraper from digging down into the ground and causes it to slide thereupon.

According to a particular feature of the invention, the bottom of the scraper comprises a channel which is open at the front of the scraper and tapers towards the rear end thereof. When the scraper is advanced on the ground, said channel runs above the furrow drawn in the ground, the edges serving as scraper edges which force the earth dug up at the furrow back thereinto.

An embodiment of the invention is illustrated in the drawing in which Figure 1 is a bottom view of the scraper, Figure 2 a side elevation and Figure 3 a front elevation thereof.

With reference to the drawing the scraper consists of a substantially rectangular block or plate having a lug 50 or other means in which it may be hinged to a seed sowing machine in any suitable manner, for example, as described in my aforesaid copending application. The scraper has front and rear edge surfaces 53, 54 as well as lateral edge surfaces 55 inclined inwardly, whereby the scraper is prevented from digging down into the ground. The bottom thereof is formed with a channel 56 open at the front and converging to the rear end thereof, the converging lateral surfaces 57 gathering the soil dug up by the share and closing the furrow.

What I claim is:

1. A furrow closing means comprising a block adapted to be advanced on the ground and having downwardly converging outer surface portions, a longitudinal channel portion in the bottom thereof, and scraping edges forming the lateral surface portions of said channel and converging rearwardly to a small rear opening at the end thereof, said block having means whereby the same may be hinged to a sowing machine.

2. A furrow closing means comprising a block having outer edge surface portions inclined inwardly and downwardly, a longitudinal channel portion in the bottom of the block, and scraping edges forming the lateral surfaces of said channel, said block having means whereby the block may be hinged to a sowing machine to enable advancing of said block in a dragging manner on the ground.

ANTON GEORG EWERTH.